United States Patent Office 2,725,398
Patented Nov. 29, 1955

2,725,398

PRODUCTION OF SALTS OF HYDROXYGLUTACONIC ALDEHYDE DIANILS

Leslie Seed, Northwich, England, assignor to Imperial Chemical Industries Limited, a corporation of Great Britain No Drawing. Application December 14, 1951,
Serial No. 261,925

Claims priority, application Great Britain
December 14, 1950

4 Claims. (Cl. 260—566)

This invention relates to a new and improved method of making salts of hydroxyglutaconic aldehyde dianils.

It is known that salts of hydroxyglutaconic aldehyde dianils can be made from furfural, aniline and aniline salts of strong acids, by reacting equimolecular proportions thereof in dilute solutions in alcohol, whereby the product crystallises out as the reaction proceeds, in the form of purple-violet needles. The purpose of the alcohol is to promote mixing of the reactants and to maintain byproducts in solution, so as to yield a substantially pure crystalline product. The object of this invention is to avoid the use of alcohol or other organic solvents in this reaction. So far as we are aware, no one has ever even considered departing from the usual organic chemical practice of using an organic solvent, in this reaction.

We have found that the reaction typified by that between equimolecular proportions of furfural, aniline and aqueous aniline hydrochloride, can be carried out in the absence of an organic solvent to give a high yield of a dianil having an excellent waterproofing effect on soils. It seemed unlikely that an organic chemical reaction between three liquids to produce a solid condensation product could be carried out efficiently and homogeneously unless a solvent was present, and it seemed by no means certain even that any of the same product would be obtained at all in the absence of a solvent. The conditions we have found are that the reagents shall be intimately mixed together, that there shall be water present but not a large proportion, and that the furfural shall only be mixed with the aniline hydrochloride or the hydrochloric acid when the aniline is present.

According to the present invention, therefore, we provide a process for the manufacture of hydroxyglutaconic aldehyde dianil salts which comprises intimately mixing furfural and a strong acid in presence of an aromatic amine and a small proportion of water but no organic solvent.

If desired, the aniline can be mixed with the furfural beforehand, in which case it is partially or wholly converted into furfurylidene aniline, which as normally obtained is a liquid at room temperature. Furfurylidene aniline so obtained should be used immediately, because on standing, particularly in presence of atmospheric oxygen, it rapidly resinifies. If desired, aniline hydrochloride can be replaced by equimolecular proportions of aniline and hydrochloric acid, in which case two moles of aniline are present when or before mixing of the furfural and hydrochloric acid occurs. Alternatively, the aniline may be mixed beforehand with the aniline hydrochloride. Concentrated hydrochloric acid containing from 10 to 35% HCl can be mixed with up to two moles of aniline and the mixture so obtained is a liquid at room temperature and is suitable for use in this invention. Any or all of the aniline used in this invention may be replaced by an equimolecular proportion of a toluidine or a xylidine. Similarly the hydrochloric acid may be replaced by sulphuric, nitric and phosphoric acids. The amount of water present should be sufficient to dissolve the aniline hydrochloride or the hydrogen chloride, whichever is used, at room temperature, in order to permit proper mixing of the reactants, but more than this is unnecessary and the reaction does not proceed so well nor give such a useful product if the amount of water exceeds 400 parts by weight per 100 parts of furfural. Expressing instead the amount of water as a proportion of the aniline salt, within the above limit we prefer to use between ½ and 3 parts by weight of water per part of aniline salt, generally between ½ and 1½ parts.

The reaction is one between two or three liquids, and mixing must be efficient. Agitation is preferably continued until a damp crumbly solid is obtained, but if the initial mixing is complete the reaction will proceed virtually to completion with little further agitation. Heat is liberated during the reaction and this accelerates the reaction, but we prefer to prevent the temperature rising above 90° C. in order to avoid undesirable side reactions. The residual water in the damp crumbly solid is removed by drying, preferably at between 100° and 130° C., to give the anhydrous product.

According to the preferred feature of our invention, therefore, we manufacture hydroxyglutaconic aldehyde dianil salts from substantially 100 parts of furfural, 160–250 parts of aniline, 30–50 parts of hydrogen chloride and 40–400 parts of water, or equimolecular proportions of their chemical equivalents as herein defined, all parts being by weight, by intimately mixing in the absence of an organic solvent, the mixing of furfural and hydrogen chloride being effected only in presence of the aniline.

We include within the scope of our invention the corresponding reactions in which the aniline is replaced by an equivalent molecular proportion of one of its homologues, particularly a toluidine or xylidine, and we include ditolil and dixylil within the generic term of dianil. We also include the manufacture of salts of sulphuric, nitric, phosphoric and other strong acids instead of the hydrochloride, by using equivalent molecular proportions of these acids instead of hydrogen chloride.

The simplest method of carrying out this process is to mix two liquids one of which contains the furfural but no hydrogen chloride, and the other is an aqueous solution containing all the hydrogen chloride but no furfural. The aniline can be in either or both of these liquids, but it is convenient to have at least half or preferably all the aniline in the aqueous hydrogen chloride solution. For example, a suitable solution would be an aqueous solution containing from 12–150 parts by weight of aniline hydrochloride, $x$ parts of aniline where $x$ is any number from 0 to 100, and from 40–400 parts by weight of water, and the process would be carried out by intimately mixing this with a liquid containing 100 parts by weight of furfural and $100-x$ parts by weight of aniline.

During the reaction, the mixture gradually solidifies and if left undisturbed it sets hard. The process is therefore most readily carried out by first mixing the liquids, for example in a stirred reaction vessel, and thereafter by kneading the mixture. Alternatively the liquids may be mixed in or added to a milling machine in which the mixture gradually solidifies and a crumbly product is obtained, and overheating is avoided so that an improved product is obtained. The kneading should be carried on for from 3–15 minutes. If desired, furfurylidene aniline and aniline hydrochloride can be added to this granular solid while it is being agitated in a pug mill or similar device. It is desirable to withdraw sufficient of the heat evolved during the mixing to prevent the temperature rising above 60°–90° C. During kneading, some of the water present evaporates off, but the crumbly solid obtained is still damp and is partly hydrated. We prefer therefore to dry and dehydrate this damp solid by heating it, if desired in a current of hot air, preferably at a temperature between 100° and 130° C.

Aniline hydrochloride is the preferred mineral acid salt, but salts of any strong acid, that is, an acid with a dissociation constant exceeding $10^{-4}$, can be used.

The product so obtained is generally in the form of a reddish blue powder. It contains approximately 9% of combined nitrogen and 11% of combined chlorine, and is insoluble in boiling benzene. It is extremely useful in the waterproofing of soil for the purpose of stabilising a soil at its optimum water content for high strength, and this is the most important use of the product. When a small proportion, generally between 0.05 and 1% by weight is incorporated in a soil, it has a waterproofing effect, so that when the treated soil is compacted at its optimum water content (which may vary, for example, from 10% for a sandy clay soil to 16% for a black cotton soil) and exposed to heavy rains it does not absorb enough water to pass its plastic limit. Thus, stabilised soil roads and stabilised soil bricks can be made using these products.

The invention is illustrated but not restricted by the following examples in which all parts are by weight.

*Example 1*

10.2 parts of aniline and 11.6 parts of furfural were mixed in a mechanically operated agate mortar. The bowl of the mortar rotated whilst the large pestle executed an oscillatory action. As soon as the water formed in the reaction caused opacity in the mixture, indicating that furfurylideneaniline had been formed with water as by-product, 13.9 parts of aniline hydrochloride dissolved in 15 parts of water were added to the mortar. The mixture rapidly became a blue pasty mass which gradually hardened to a moist powder. The mixture was worked for 10 minutes after the addition of the aniline hydrochloride. The damp product was dried at 60° C. and 100 mm. Hg absolute pressure. 31 parts of fine red-blue solid were recovered. The product contained 8.9% nitrogen and 11.6% chlorine, and the yield was 96% of the theoretical. The theoretical content for $C_{17}H_{17}ON_2Cl$ is 9.3% nitrogen, and 11.8% chlorine. When the product was treated for 2 hours in an extraction apparatus with boiling benzene, it lost no weight. The product functioned efficiently as a waterproofing agent for soil, and from X-ray, infra red and ultraviolet analysis is believed to have the constitution

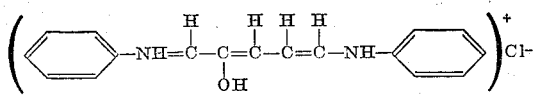

The product also had the same chemical properties as the known substance to which this formula has been ascribed.

*Example 2*

170 parts of aniline and 177 parts of furfural were charged to a jacketed twin Z-blade mixer. The mixer was running and cooling water was applied to the jacket. When the initial reaction abated, a further 170 parts of aniline were added and the pasty mass was milled to a clear solution. A solution containing 208 parts of 32° Twaddell hydrochloric acid and 86 parts of water was then added. The mass rapidly set to a stiff paste which was milled for 15 minutes. The product was dried at 60° C. and 100 mm. Hg absolute pressure for 16 hours. 570 parts of red-blue solid were obtained containing 8.63% N and 11.24% Cl. Calculated for $C_{17}H_{17}ON_2Cl \cdot H_2O$, the monohydrate, N=8.8%, Cl=11.4%. The product was almost insoluble in benzene, and waterproofed soil.

*Example 3*

256 parts of furfural and 1272 parts of a solution containing 358 parts of aniline hydrochloride, 244 parts of aniline and 670 parts of water were charged simultaneously to a cooled, running Z-blade mixer, and the mix was milled for 18 minutes. The final paste containing 35% of water was dried to the anhydrous condition in an electrically heated oven with circulating air at 115° C. The time required was 5 hours. 810 parts of a highly active product for waterproofing soil were obtained.

*Example 4*

100 parts of pure furfural and 316 parts of a solution containing 26.3% of water, 30.7% of aniline and 44% of aniline hydrochloride were pumped continuously in to a mixing nozzle and then discharged to a continuous pug mixed wherein the hold-up time was 5 minutes. The discharged damp product was then dried by hot air at 110° C. to the anhydrous state and was found to be similar to the products described previously.

*Example 5*

The mixed liquids described in Example 4 were spread in a thin layer on a moving band. After 5 minutes' retention on the band, the solid was scraped off and dried in an oven at 130° C. The product was similar in composition and activity to those of the other examples.

What I claim is:

1. A process as recited in claim 3 in which the mixture is kneaded for from 3 to 15 minutes.

2. A process as recited in claim 3 in which the solid so obtained is dried and dehydrated by heating at between 100° and 130° C.

3. A process for the manufacture of hydroxygutaconic aldehyde dianil salts which comprises intimately mixing by weight 100 parts of furfural, an equivalent molecular proportion of an aromatic amine selected from the group consisting of aniline, toluidine and xylidine corresponding to 160–250 parts of aniline, an equivalent molecular proportion of a strong acid having a dissociation constant exceeding $10^{-4}$ corresponding to 30–50 parts of hydrogen chloride and 40–400 parts of water in the absence of any additional organic solvent, the mixing of the furfural and strong acid being effected in the presence of the aromatic amine, and preventing the temperature of the mixture from exceeding approximately 90° C.

4. A process for the manufacture of hydroxyglutaconic aldehyde dianil salts which comprises intimately mixing a liquid containing 100 parts by weight of furfural and no strong acid with an aqueous solution containing an equivalent molecular proportion of a strong acid having a dissociation constant exceeding $10^{-4}$ corresponding to 30–50 parts by weight of hydrogen chloride and no furfural, there being incorporated in at least one of the aforesaid liquids a total equivalent molecular proportion of an aromatic amine selected from the group consisting of aniline, toluidine, and xylidine corresponding to 160–250 parts by weight of aniline, the total amount of water present being between 40 and 400 parts by weight, the intimate admixture so obtained containing substantially no additional organic solvent, and preventing the temperature of the intimate admixture so obtained from exceeding approximtaely 90° C.

References Cited in the file of this patent

UNITED STATES PATENTS 1,441,598    Phillips _____ Jan. 9, 1923

OTHER REFERENCES

Dieckmann et al.; Ber. Deut. Chem., vol. 38, 1905, pp. 4122–5.

Zincke et al.: Ber. Deut. Chem., vol. 38, 1905, pp. 3824–28.

Konig: J. Pract. Chem., vol. 180, 1905, pp. 556–60.

Stenhouse: Justis Liebig's Ann., vol. 156, 1870, p. 199.